(12) United States Patent
Goossen et al.

(10) Patent No.: US 8,375,837 B2
(45) Date of Patent: Feb. 19, 2013

(54) CATCH AND SNARE SYSTEM FOR AN UNMANNED AERIAL VEHICLE

(75) Inventors: Emray R. Goossen, Albuquerque, NM (US); Steven D. Martinez, Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 675 days.

(21) Appl. No.: 12/355,821

(22) Filed: Jan. 19, 2009

(65) Prior Publication Data
US 2010/0181424 A1 Jul. 22, 2010

(51) Int. Cl.
*B64D 1/00* (2006.01)
(52) U.S. Cl. .............. 89/1.11; 244/110 F; 244/139
(58) Field of Classification Search .............. 244/110 C, 244/110 F, 139, 158.1; 89/1.11
See application file for complete search history.

(56) References Cited

U.S. PATENT DOCUMENTS

| | | | |
|---|---|---|---|
| 4,196,668 A * | 4/1980 | Morlock et al. | 102/473 |
| 4,202,279 A | 5/1980 | Rand | |
| 4,442,018 A | 4/1984 | Rand | |
| 4,768,417 A * | 9/1988 | Wright | 89/1.11 |
| 5,150,857 A | 9/1992 | Moffitt et al. | |
| 5,152,478 A | 10/1992 | Cycon et al. | |
| 5,295,643 A | 3/1994 | Ebbert et al. | |
| 5,467,682 A | 11/1995 | Brooks | |
| 5,575,438 A | 11/1996 | McGonigle et al. | |
| 5,583,311 A | 12/1996 | Rieger | |
| 5,695,153 A | 12/1997 | Britton et al. | |
| 5,898,125 A | 4/1999 | Mangolds et al. | |
| 6,182,553 B1 * | 2/2001 | Peterson | 89/1.11 |
| 6,450,445 B1 | 9/2002 | Moller | |
| 6,604,706 B1 | 8/2003 | Bostan | |
| 6,626,077 B1 | 9/2003 | Gilbert | |
| 6,691,949 B2 | 2/2004 | Plump et al. | |
| 6,721,646 B2 | 4/2004 | Carroll | |
| 6,854,374 B1 * | 2/2005 | Breazeale | 86/50 |
| 6,904,838 B1 | 6/2005 | Dindl | |
| 6,957,602 B1 | 10/2005 | Koenig et al. | |
| 7,032,861 B2 | 4/2006 | Sanders, Jr. et al. | |
| 7,044,422 B2 | 5/2006 | Bostan | |
| 7,097,137 B2 | 8/2006 | McDonnell | |
| 7,201,348 B1 | 4/2007 | Flammer | |
| 7,249,732 B2 | 7/2007 | Sanders, Jr. et al. | |
| 7,264,204 B1 | 9/2007 | Portmann | |
| 7,328,644 B2 | 2/2008 | Vickroy | |
| 7,412,916 B2 * | 8/2008 | Lloyd | 89/1.11 |

(Continued)

FOREIGN PATENT DOCUMENTS

| | | | |
|---|---|---|---|
| EP | 1767453 A1 | 3/2007 | |
| EP | 1767453 B1 | 6/2008 | |

(Continued)

*Primary Examiner* — Tien Dinh
*Assistant Examiner* — Michael Kreiner
(74) *Attorney, Agent, or Firm* — Shumaker & Sieffert, P.A.

(57) ABSTRACT

The present invention provides a catch and snare system for an unmanned aerial vehicle comprising: (a) a detection system, (b) a deployment system in communication with the detection system, (c) a capture system placed at an interference position by the deployment system, wherein the capture system comprises a net, a plurality of foam deploying canisters attached to the net for deploying foam, and at least one canister for deploying a decelerating parachute attached to the net, wherein the foam prevents the release of chemical or biological agents from the captured unmanned aerial vehicle, and (d) a descent system to bring the capture system and a captured unmanned aerial vehicle back to earth.

20 Claims, 9 Drawing Sheets

U.S. PATENT DOCUMENTS

| | | | |
|---|---|---|---|
| 7,415,917 B2 * | 8/2008 | Lloyd | 102/473 |
| 7,900,548 B2 * | 3/2011 | Hoadley et al. | 89/36.17 |
| 2004/0094662 A1 | 5/2004 | Sanders, Jr. et al. | |
| 2004/0129828 A1 | 7/2004 | Bostan | |
| 2005/0082421 A1 | 4/2005 | Perlo et al. | |
| 2006/0049304 A1 | 3/2006 | Sanders, Jr. et al. | |
| 2006/0192047 A1 | 8/2006 | Goossen | |
| 2006/0231675 A1 | 10/2006 | Bostan | |
| 2007/0034738 A1 | 2/2007 | Sanders, Jr. et al. | |
| 2007/0051848 A1 | 3/2007 | Mantych et al. | |
| 2007/0193650 A1 | 8/2007 | Annati | |
| 2007/0221790 A1 | 9/2007 | Goossen et al. | |
| 2007/0228214 A1 | 10/2007 | Horak | |
| 2007/0244608 A1 | 10/2007 | Rath et al. | |
| 2007/0261542 A1 * | 11/2007 | Chang et al. | 89/1.11 |
| 2007/0262195 A1 | 11/2007 | Bulaga et al. | |
| 2007/0295298 A1 | 12/2007 | Mark | |

FOREIGN PATENT DOCUMENTS

| | | |
|---|---|---|
| WO | 0015497 | 3/2000 |
| WO | 2004002821 | 1/2004 |

* cited by examiner

CATCH AND SNARE SYSTEM FOR AN UNMANNED AERIAL VEHICLE

BACKGROUND OF THE INVENTION

There are systems in the art for intercepting intercontinental ballistic missiles, shoulder-launched rockets, and/or rocket propelled grenades. One example of an interception system operates by deploying a kill missile to destroy the incoming missile, which results in a debris field. Another example of an interception system involves launching a containment blanket made of Kevlar to contain the missile even if it detonates. Still further, an intercept device for flying objects exists that neither seriously damages nor destroys the flying object in question, but has a negative effect on its flying properties and then the intercept device destroys itself at a selected point in time so the flying object can return to its airfield unhindered and safely land.

However, with the advent of the low cost unmanned aerial vehicle, which can carry a significant payload of biological or chemical weapons, these previous interception systems are ineffective. Shooting down the UAV could trigger dispersal of the chemical or biological agent onboard. In addition, simply capturing the UAV in a net or containment blanket will not prevent the chemical or biological agent from leeching out into the atmosphere since these structures are not equipped to contain vapors and/or liquids. Moreover, merely diverting a UAV from its mission path does not constitute containing and isolating a biological or chemical threat. Thus, systems that can safely guide the UAV to earth, while at the same time preventing release of the biological or chemical threat until a hazmat team can isolate it, are generally desirable.

SUMMARY OF THE INVENTION

The discovery presented herein details a catch and snare system for an unmanned aerial vehicle that has a beneficial effect of preventing the release of chemical or biological agents from the captured unmanned aerial vehicle into the environment.

Thus, in one aspect, the present invention provides a catch and snare system for an unmanned aerial vehicle comprising: (a) a detection system, (b) a deployment system in communication with the detection system, (c) a capture system placed at an interference position by the deployment system, wherein the capture system comprises a net, a plurality of foam deploying canisters attached to the net for deploying foam, and at least one canister for deploying a decelerating parachute attached to the net, wherein the foam prevents the release of chemical or biological agents from the captured unmanned aerial vehicle into the environment, and (d) a descent system to bring the capture system and a captured unmanned aerial vehicle back to earth.

In a second aspect, the present invention provides a catch and snare system for an unmanned aerial vehicle comprising: (a) a detection system, (b) a deployment system in communication with the detection system, (c) a capture system placed at an interference position by the deployment system, wherein the capture system comprises a plurality of foam mines that create an aerial minefield that is triggered to expand just before the unmanned aerial vehicle flies into the minefield to adhere to the unmanned aerial vehicle via surface contact with the foam while the plurality of foam mines continue to expand until at least a portion of the unmanned aerial vehicle is encapsulated in the expanded foam mines, wherein the foam prevents the release of chemical or biological agents from the captured unmanned aerial vehicle into the environment, and (d) a descent system to bring the capture system and a captured unmanned aerial vehicle back to earth.

In a third aspect, the present invention provides a method for employing a catch and snare system for an unmanned aerial vehicle comprising: (a) monitoring the perimeter of a target site, (b) detecting an unmanned aerial vehicle within a predetermined distance of the perimeter, (c) launching a capture system, (d) capturing the unmanned aerial vehicle, wherein capturing the unmanned aerial vehicle comprises the steps of (i) deploying a net, (ii) deploying at least one decelerating parachute, (iii) deploying foam, (iv) blocking the unmanned aerial vehicle's flight path and causing the unmanned aerial vehicle to contact the net, and (v) encapsulating at least a portion of the unmanned aerial vehicle in the foam and the net, wherein the foam prevents the release of chemical or biological agents from the captured unmanned aerial vehicle into the environment, and (e) guiding the captured unmanned aerial vehicle to earth.

In a fourth aspect, the present invention provides a method for employing a catch and snare system for an unmanned aerial vehicle comprising: (a) monitoring the perimeter of a target site, (b) detecting an unmanned aerial vehicle within a predetermined distance of the perimeter, (c) launching a capture system, (d) capturing the unmanned aerial vehicle, wherein the step of capturing the unmanned aerial vehicle comprises the steps of (i) dispersing a plurality of foam mines to create an aerial minefield, (ii) triggering the plurality of foam mines to expand just before the unmanned aerial vehicle flies into the minefield, (iii) adhering the plurality of foam mines to the unmanned aerial vehicle via surface contact with the foam while the plurality of foam mines continue to expand, and (iv) encapsulating at least a portion of the unmanned aerial vehicle in the expanded foam mines, wherein the foam prevents the release of chemical or biological agents from the captured unmanned aerial vehicle into the environment, and (e) guiding the captured unmanned aerial vehicle to earth.

DETAILED DESCRIPTION OF THE PREFERRED EMBODIMENT

Figure 1:
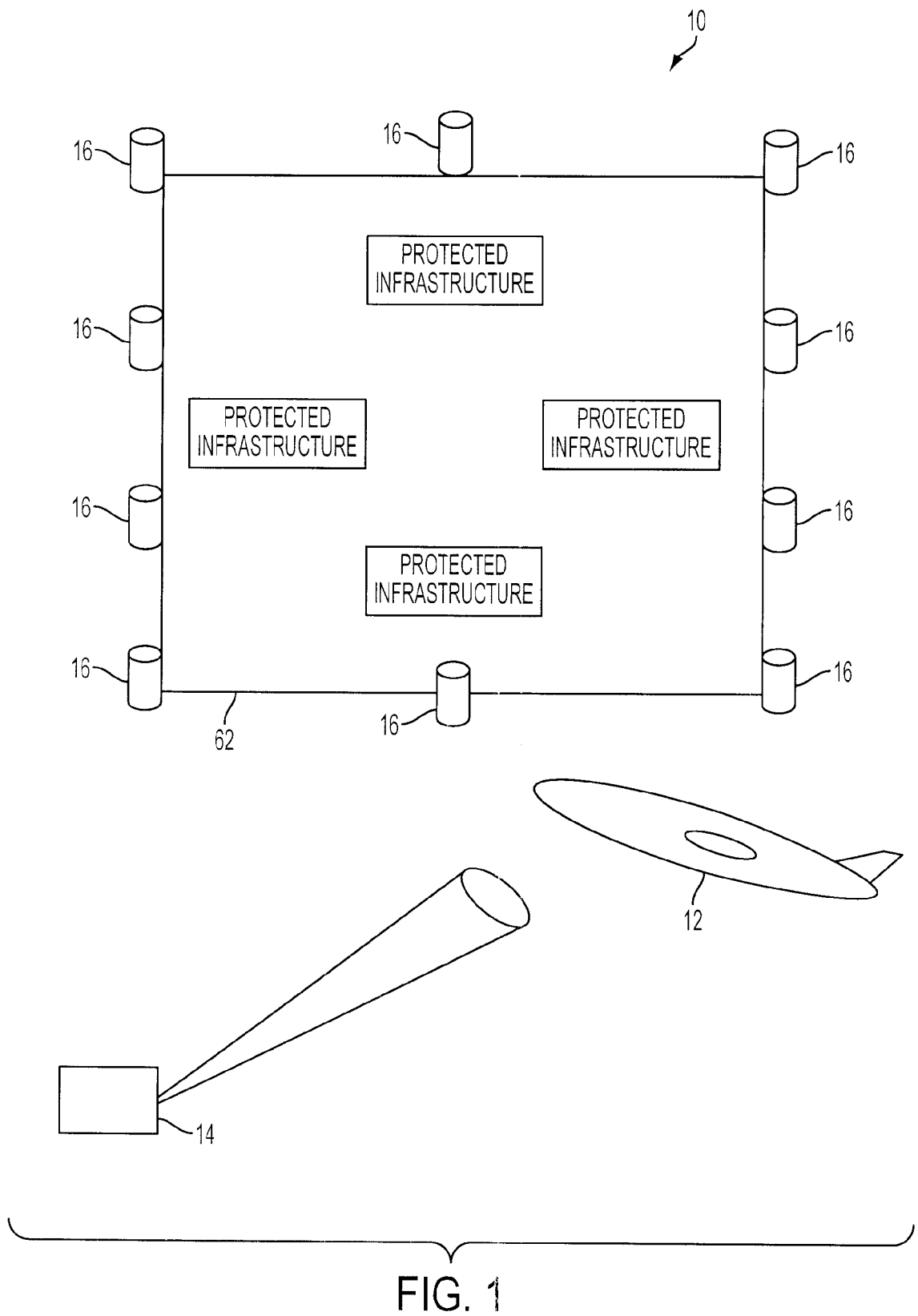
FIG. 1 is an elevated view of a catch and snare system in place around the perimeter of a target site.
Figure 2:
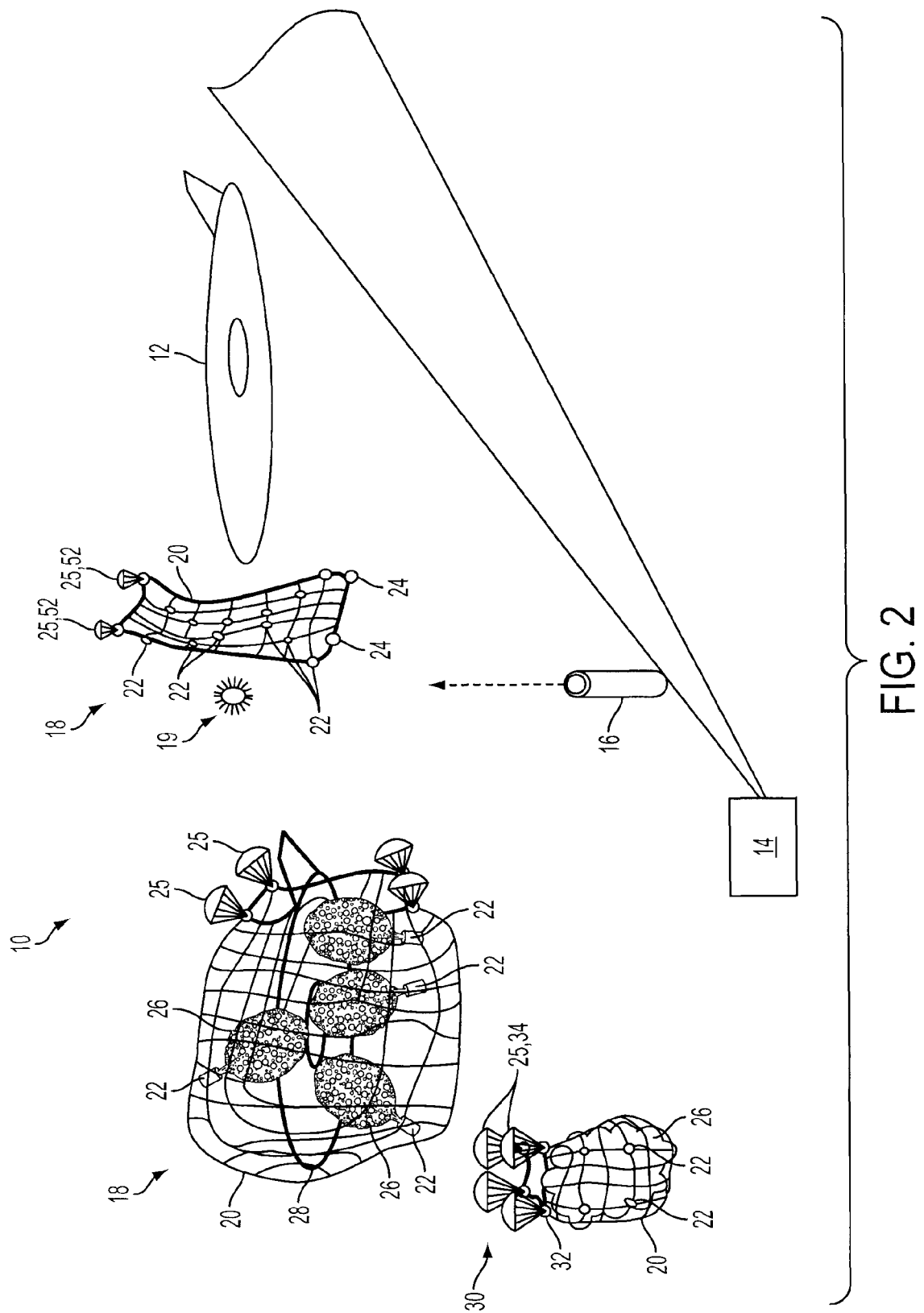
FIG. 2 illustrates the detection system, deployment system, capture system, and descent system.

In one aspect, as shown in FIGS. 1-7, the present invention provides a catch and snare system 10 for an unmanned aerial vehicle 12 comprising: (a) a detection system 14, (b) a deployment system 16 in communication with the detection system 14, (c) a capture system 18 placed at an interference position by the deployment system 16, wherein the capture system 18 comprises a net 20, a plurality of foam deploying canisters 22 attached to the net 20 for deploying foam, and at least one canister 24 for deploying a decelerating parachute 25 attached to the net 20, wherein the foam 26 prevents the release of chemical or biological agents from the captured unmanned aerial vehicle 28 into the environment, and (d) a descent system 30 to bring the capture system 18 and a captured unmanned aerial vehicle 28 back to earth.

As used herein, there are a variety of detection systems known in the art for detecting an unmanned aerial vehicle (UAV) 12. For example, the detection system 14 may identify the UAV 12, via radar, and a local or satellite-based communications network may transmit data to a command, control, and communications (CCC) base that indicates the UAV's location, velocity, and trajectory. The CCC base receives the data and determines a launch position and/or other trajectory characteristics necessary to intercept, contain, and retrieve the UAV 12.

As used herein, a deployment system 16 comprises a launcher configured to dispatch the capture system 18 to the interference position. The deployment system 16 may be based on land, air, or water. The air-based deployment system 16 may include, for example, a tethered balloon or manned or unmanned aerial vehicle that launches the capture system 18 from a guided missile or, alternatively, moves into position and drops the capture system 18 to the interference position. The CCC base and deployment system 16 may be positioned in separate locations or may be integrated systems in the same locale. The land- and water-based deployment systems 16 may comprise standard mortar launch systems. In addition, the air-, land-, and water-based deployment systems 16 may each be of another type known in the art. The deployment system 16 receives data from the CCC base that triggers deployment of the capture system 18 to the proper coordinates or interference position in order to intercept, contain, and retrieve the UAV 12.

As used herein, a capture system 18 comprises a launch capsule 19 into which is packaged a net 20, a plurality of foam deploying canisters 22 attached to the net 20, and at least one canister 24 for deploying a decelerating parachute 25 attached to the net 20. The net 20 is made of a lightweight, low volume, high strength fiber, preferably Spectra® fiber. The impact between the UAV 12 and the net 20 should generally be negligible so as not to trigger premature release of the biological or chemical weapon. Depending on the kinetic energies of the UAV 12 and the net assembly, the net 20 may not slow the UAV 12 to a stop necessitating the use of parachutes to further slow the combined assembly. The at least one decelerating parachute 25 may deploy prior to or after the UAV 12 contacts the net 20. If the at least one decelerating parachute 25 is deployed prior to the UAV 12 contacting the net 20, then the decelerating parachute 25 may assist the net 20 with hovering in mid-air. Once the UAV 12 contacts the net 20, the net 20 wraps around the UAV 12 such that the edges of the net 20 essentially join at or near the rear of the UAV 12, properly aligning the plurality of foam deploying canisters 22 along the length of the UAV 12. The typical UAV 12 weighs between 1 to 50 kilograms and is traveling between 30 to 120 knots. The at least one decelerating parachute 25 alone, or in combination with additional decelerating parachutes 25, is capable of rapidly bringing this typical UAV 12 to a halt. Since the velocity of the UAV 12 is greatly slowed, the wind velocity will be substantially lower during foam deployment.

Figure 7:
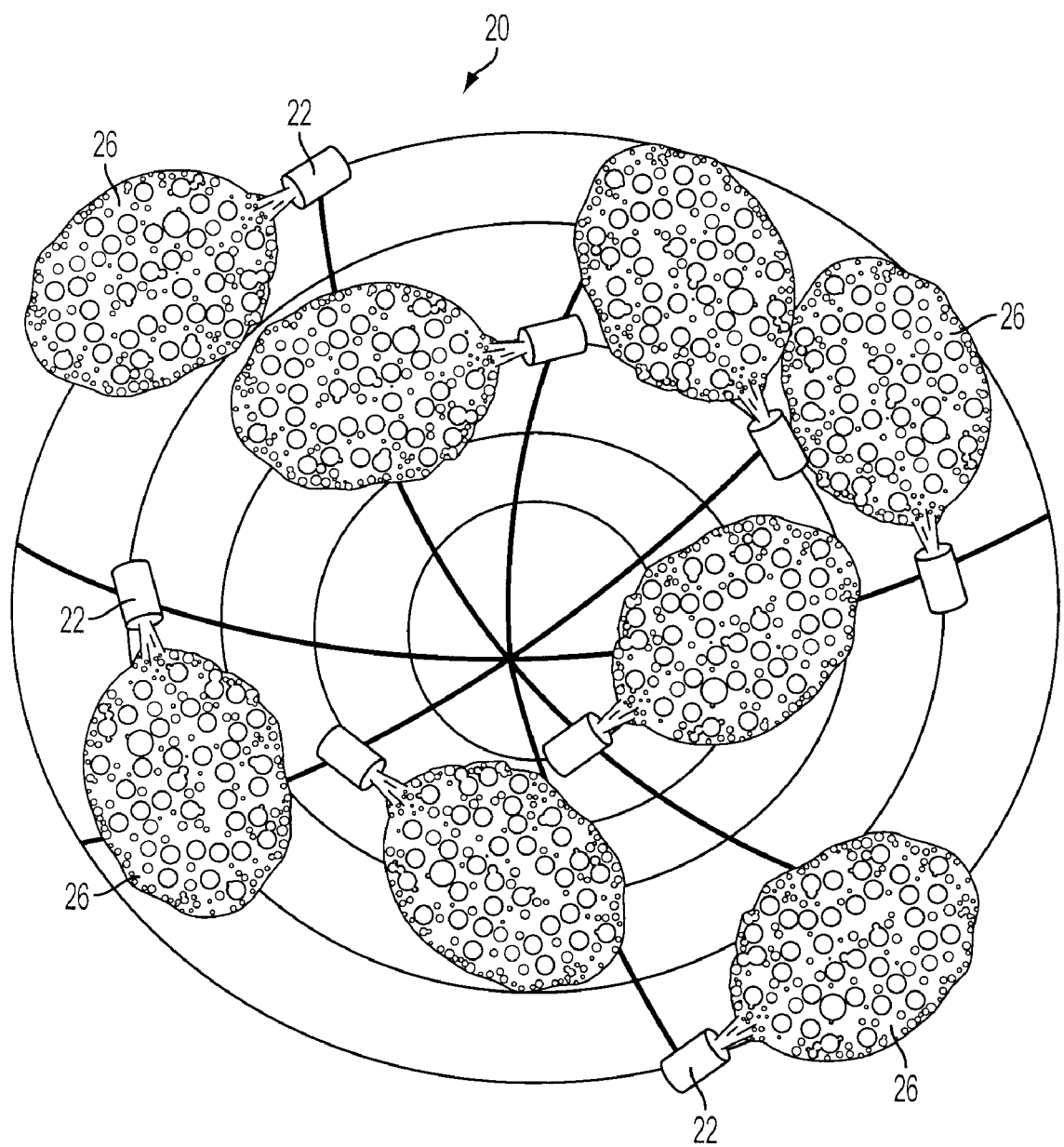
FIG. 7 is a front view of one embodiment of the capture system's net engaged with an unmanned aerial vehicle and deploying sticky foam.

As shown in FIG. 7, after the UAV 12 is slowed, the foam 26 is triggered to deploy from the canisters 22. The triggering mechanism is of a type known in the art, for example, an accelerometer, a timer, a manual deployment signal from the CCC base, or any other technique known in the art. As the UAV 12 is slowed by the net and below the velocity needed to maintain a foam bubble, the sticky foam 26 is released to begin encapsulation substantially before the orientation of the UAV 12 is altered so as to avoid triggering of any bio release mechanisms. The net 20 will essentially wrap the foam deploying canisters 22 into proper orientation around the UAV 12 while minimizing inertial impact to the UAV 12. This will minimize the risk of inertially triggered bio-release mechanisms on the UAV 12. Alternatively, the foam 26 may deploy just before the UAV 12 contacts the net 20 such that the sticky foam 26 and the net 20 substantially encapsulate the UAV 12 upon impact.

As used herein, the plurality of foam deploying canisters 22 are made of a lightweight material, preferably carbon fiber. Each of the plurality of foam deploying canisters 22 contains one or more jets that direct the path of the foam 26. The foam deploying canisters 22 are oriented in a cooperative direction so that the foam paths merge and join completely to encapsulate at least a portion of the UAV 12, namely the portion containing the hazardous payload. The foam deploying canister 22 may be constructed using systems known in the art. For instance, the foam deploying canister 22 may comprise a pressurized gas supply, a gas valve, a gas conduit, a vessel containing sticky foam, a burst valve, a solution conduit, and a delivery orifice. The pressurizing gas is inactive until the gas valve is actuated, and the gas flows through the gas conduit into the vessel until the pressure within the vessel reaches a predetermined value and the burst valve ruptures directing the contents of the vessel to flow through the solution conduit to the delivery orifice and then into the surrounding environment. The combined plurality of foam deploying canisters 22 would have to deploy approximately five hundred cubic feet of expanded foam 26 to substantially encapsulate an entire UAV 12 weighing 50 kg. Lighter than air propellants may be used to assist in keeping the foam bubble aloft and to reduce the sink rate.

As used herein, the foam 26 remains stable sufficiently long enough for hazmat neutralization of any potential chemical or biological agents. The closed cell structure of the foam 26 captures or contains any vapors to the extent that vapors do not degrade the foam 26. The thickness of the foam covering 26 can vary according to the anticipated biological or chemical agent payload on the UAV 12 and is controlled by the pressure under which the foam 26 is released. Preferably the foam 26 is a ninety percent closed cell structure that is substantially four inches thick. The preferred cure time is very rapid, approximately thirty seconds, though longer cure times are contemplated depending on the type of threat. Examples of the type of foam 26 contemplated include sticky foam disclosed in U.S. Pat. No. 4,202,279 and stabilized aqueous foam systems and concentrate disclosed in U.S. Pat. No. 4,442,018. The disclosures of U.S. Pat. Nos. 4,202,279 and 4,442,018 are incorporated by reference herein.

As used herein, a descent system 30 comprises at least one canister 32 attached to the net 20 that deploys at least one descent parachute 34 to guide the captured UAV 28 to the ground. The at least one descent parachute 34 must be capable of withstanding the dynamic forces of the descending UAV 28, the plurality of foam deploying canisters 22, as well as the deployed foam 26. In one embodiment, the descent parachute 34 may be the same as the at least one decelerating parachute 25. For example, after the UAV 12 decelerates sufficiently due to the decelerating parachute 25, the UAV 12, 28 will begin to fall towards the ground at which time the decelerating parachute 25 will be substantially vertical relative to the ground and acting as a descent parachute 34. Alternatively, a separate descent parachute 34 may be deployed from a canister 32 attached to the net 20 near the net's edge and therefore near the rear of the UAV 12, 28. This separate descent parachute 34 preferably deploys at approximately the same time the foam 26 begins to deploy from the canisters 22. Further, this separate descent parachute 34 is preferably attached to the net 20 by one or more lines (not shown) that extend the suspension lines 36 and the parachute's canopy 38 beyond the reach of the foam 26.

In one embodiment, the foam has an expansion ratio that is at least 20:1. The preferred foam expansion ratio is in the range of 20:1 to 200:1, although higher expansion ratios are contemplated.

Figure 3:
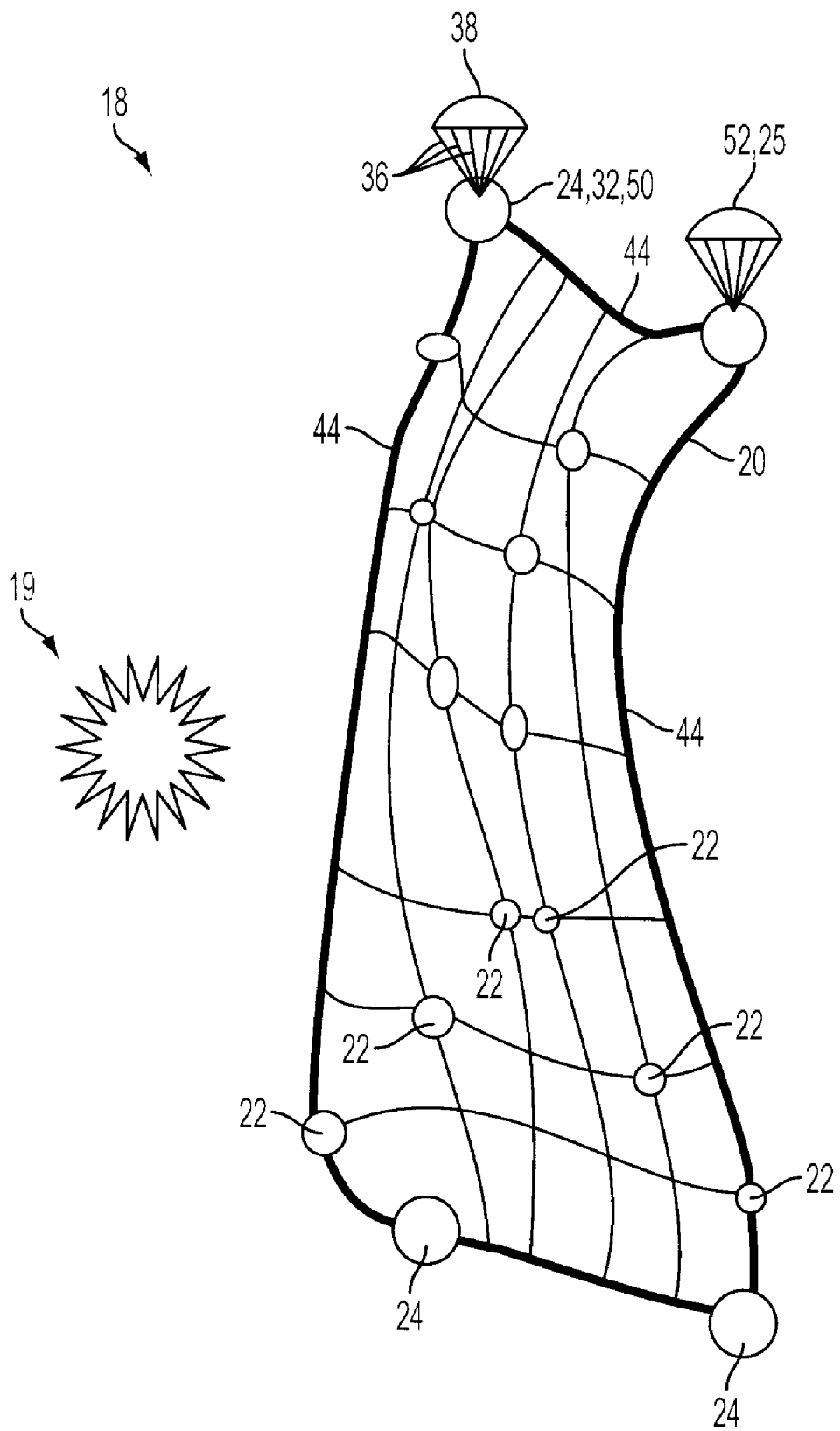
FIG. 3 illustrates one embodiment of the capture system.
Figure 4:
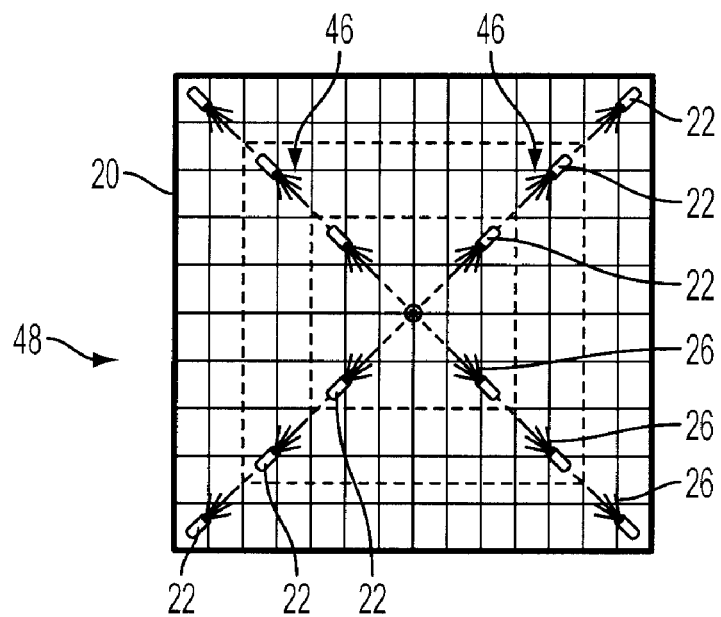
FIG. 4 is a front view of one embodiment of the capture system's planar net and the spacing of the plurality of foam deploying canisters.
Figure 6:
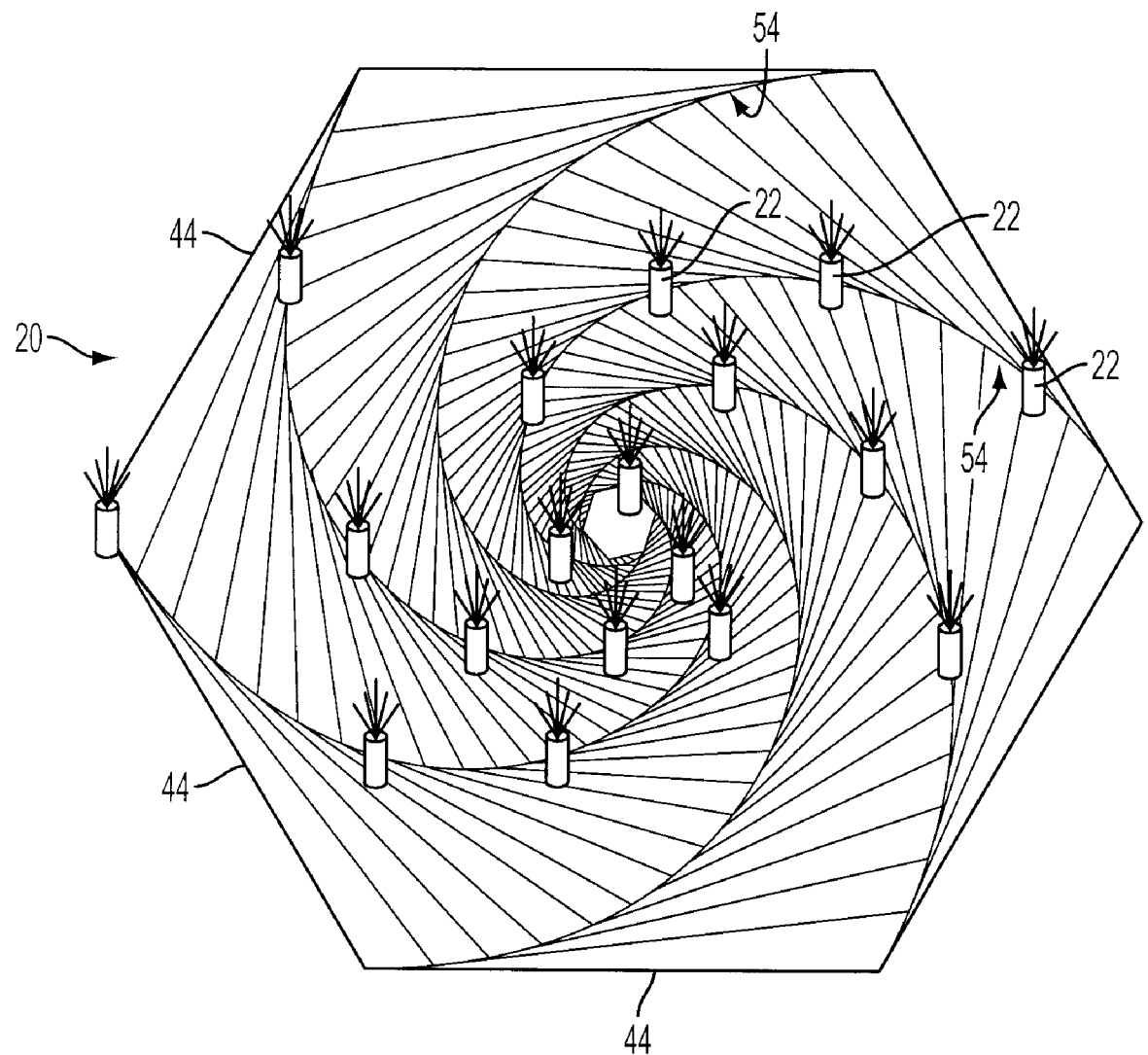
FIG. 6 is a front view of one embodiment of the capture system's planar net in a helical non-interference interleaving pattern.

In one embodiment, as shown in FIGS. 3-4 and 6, the net 20 is substantially planar upon deployment. The planar net 20 may comprise any number of shapes, for example, the net may be square, circular, or hexagonal. As used herein, substantially planar means that the net 20 is unfolded or unpackaged from the launch capsule 19 and the net edges 44 are essentially fully extended. The net 20 is considered to be substantially planar even in the event that a wind gust causes some slight bending or billowing in the net 20, as shown in FIG. 3.

Figure 5:
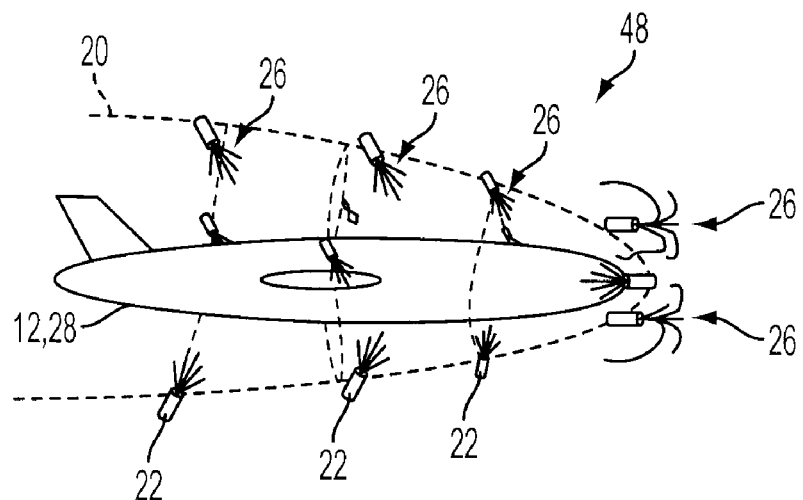
FIG. 5 is a side view of the capture system engaged around an unmanned aerial vehicle.

In one embodiment, the plurality of foam deploying canisters 22 are arranged along at least two lines 46 that cross at the center of the net 20, as shown in FIGS. 3-4. In this embodiment the net 20 is grid-like or comprises polygons or diamonds joined at their corners in a repeating pattern, for example. In an embodiment where there are only two lines 46, these lines 46 are preferably substantially perpendicular to one another and, in the case of a square net 20, each line 46 preferably extends diagonally from corner to corner in an "X" configuration 48, as shown in FIGS. 4-5. This "X" configuration 48 provides foam coverage to four sides of the UAV 12. Where there are more than two lines 46 present, the lines 46 are preferably spaced so as to be substantially equidistant from each other to ensure even deployment of foam 26.

In one embodiment, the capture system 18 further comprises at least one canister 50 attached to the net 20 for deploying at least one hover parachute 52, and wherein the descent system 30 comprises at least one canister 32 attached to the net 20 for deploying at least one descent parachute 34. As used herein, employing a hover parachute 52 allows the net 20 to be launched further in advance of the approach of the UAV 12 and still remain at the proper interference position. The at least one hover parachute 52 may comprise the at least one decelerating parachute 25 such that the decelerating parachute 25 is deployed essentially at the time the net 20 has unfolded from the launch capsule 19 or shortly thereafter. Alternatively, the at least one hover parachute 52 may be smaller and weigh less than the at least one decelerating parachute 25 and the at least one hover parachute 52 may have shorter suspension lines 36 such that a portion of the at least one hover parachute 52 may be subsumed by the foam 26.

As used herein, the at least one descent parachute 34 may comprise the hover parachute 52 and/or the decelerating parachute 25 or may comprise a separate parachute altogether. The descent parachute 34 may be deployed at any time after the net 20 is unfolded as long as the canopy 38 and suspension lines 36 are long enough to extend beyond the deployed foam's reach 26. Alternatively, the descent parachute 34 is deployed after the UAV's forward velocity has halted.

In one embodiment, as shown in FIG. 6, the net 20 is designed in a helical non-interference interleaving pattern and the plurality of foam deploying canisters 22 are spaced along the main lines 54 extending from the center of the net 20 to the net edges. The plurality of foam deploying canisters 22 are spaced apart to maximize foam deployment over the UAV's surface, while minimizing canister interference when stored. The foam deploying canisters 22 are spaced and sized according to the required volume each must supply. For example, where the canisters 22 are equidistantly spaced, the canister volume is largest at the net's edges and gradually decreases the closer they are placed to the center of the net's interleaving spiral.

In one embodiment, the capture system 18 further comprises at least one canister 50 attached to the net 20 for deploying at least one hover parachute 52, and wherein the descent system 30 comprises at least one canister 32 attached to the net 20 for deploying at least one descent parachute 34. As used herein, employing a hover parachute 52 allows the net 20 to be launched further in advance of the approach of the UAV 12 and still remain at the proper interference position. The at least one hover parachute 52 may comprise the at least one decelerating parachute 25 such that the decelerating parachute 25 is deployed essentially at the time the net 20 has unfolded from the launch capsule 19 or shortly thereafter. Alternatively, the at least one hover parachute 52 may be smaller and weigh less than the at least one decelerating parachute 25 and the at least one hover parachute 52 may have shorter suspension lines 36 such that a portion of the at least one hover parachute 52 is subsumed by the foam 26.

As used herein, all the foregoing descriptions and embodiments with respect to the first aspect are equally applicable to the following aspects as well. Furthermore, all embodiments disclosed for each aspect may be combined with other embodiments.

Figure 8A:
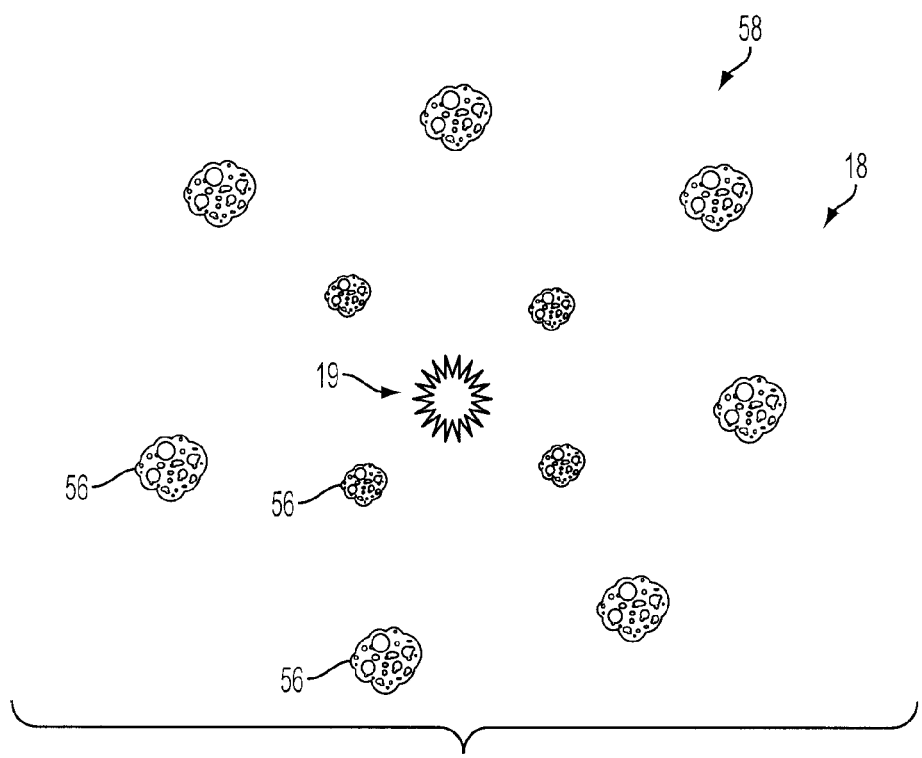
FIG. 8a is a view of one embodiment of the capture system's foam mines and mine field.
Figure 8B:
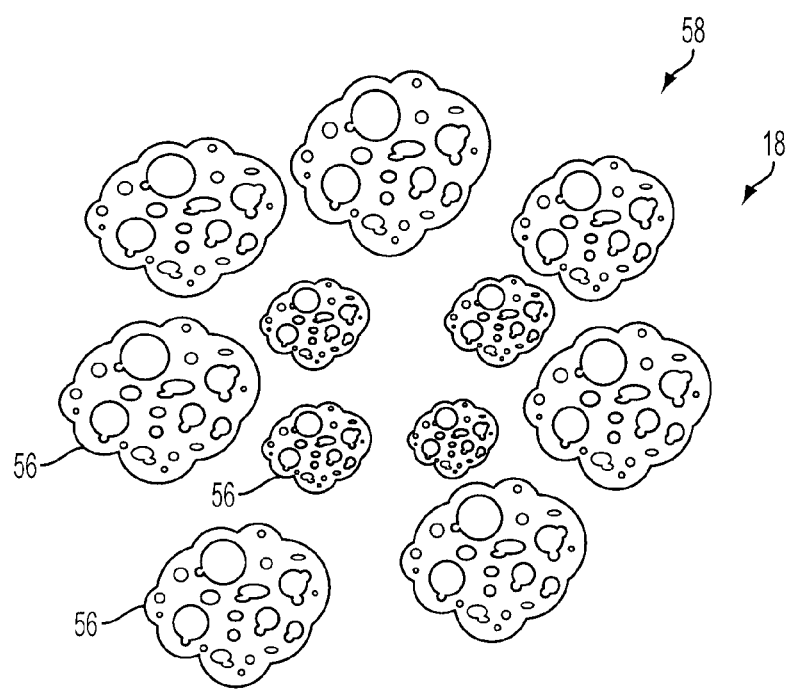
FIG. 8b is a view of one embodiment of the capture system's foam mines dispersing within the mine field.
Figure 9:
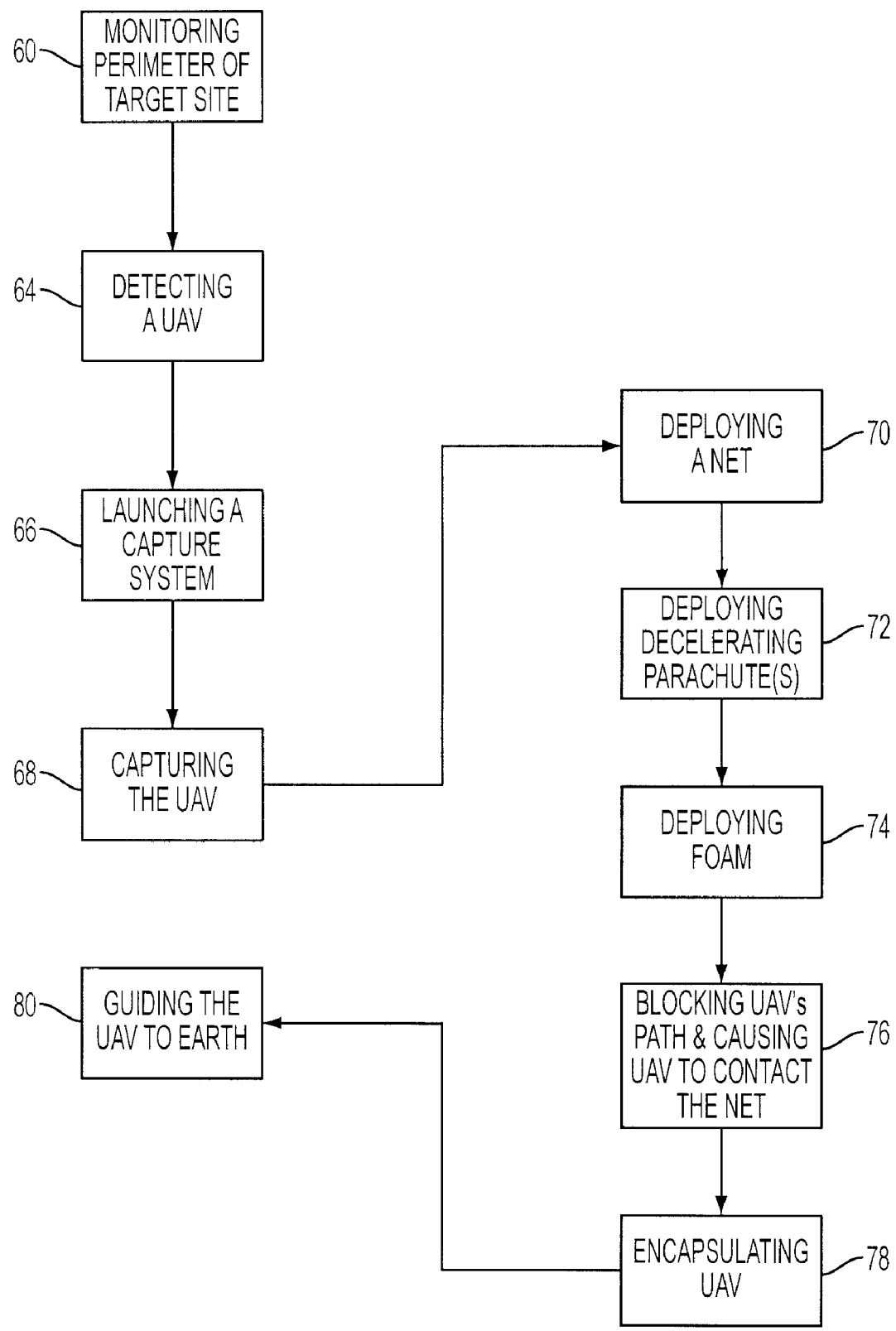
FIG. 9 illustrates the steps to UAV capture from a ground launched capture system.
Figure 10:
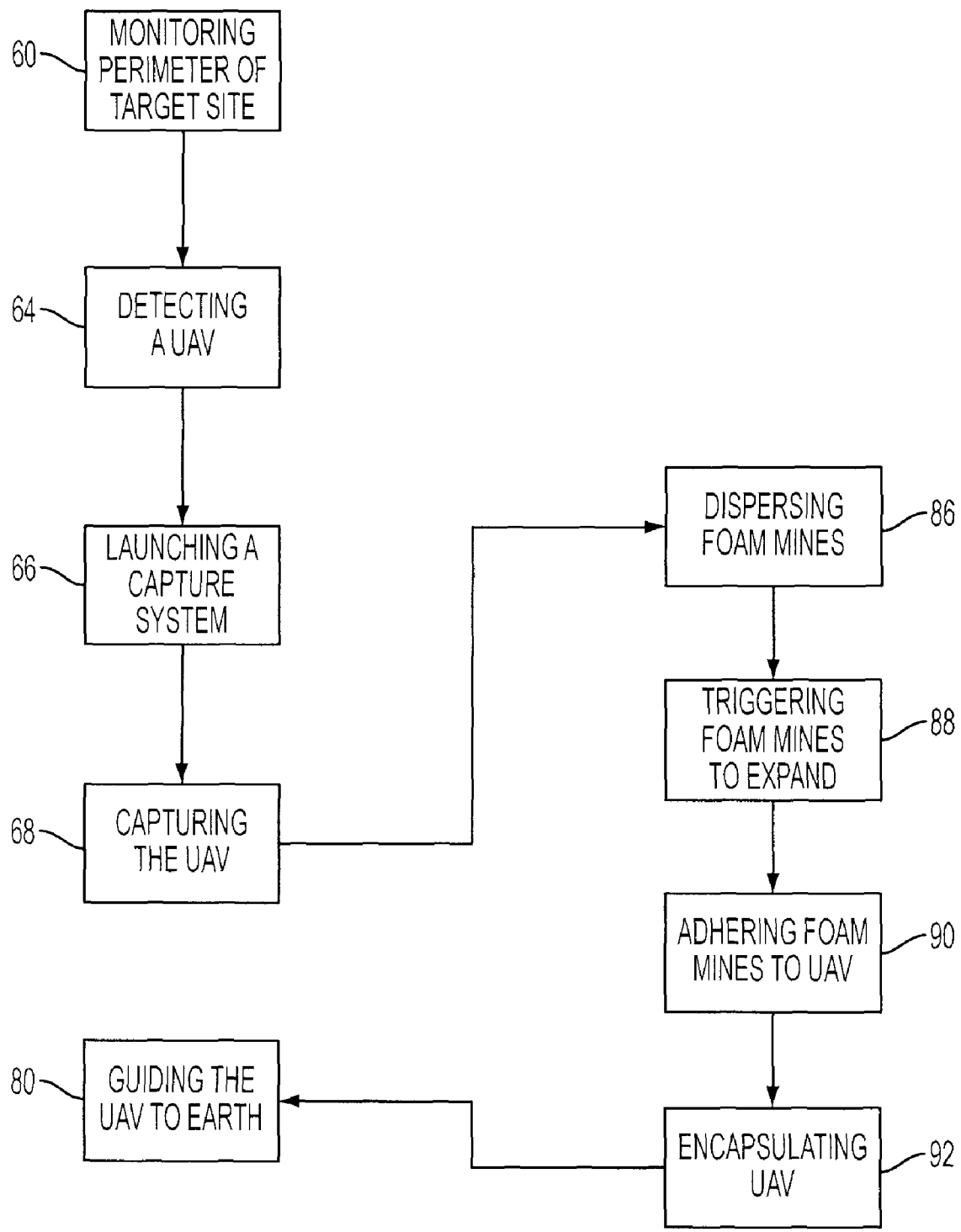
FIG. 10 illustrates the steps to UAV capture within a mined airspace.

In a second aspect, as shown in FIGS. 1 and 8a-8b, the present invention provides a catch and snare system 10 for a UAV 12 comprising: (a) a detection system 14, (b) a deployment system 16 in communication with the detection system 14, (c) a capture system 18 placed at an interference position by the deployment system 16, wherein the capture system 18 comprises a plurality of foam mines 56 that create an aerial minefield 58 that is triggered to expand just before the UAV 12 flies into the minefield 58 to adhere to the UAV 12 via surface contact with the foam 26 while the plurality of foam mines 56 continue to expand until at least a portion of the UAV 28 is encapsulated in the expanded foam mines 56, wherein the foam 26 prevents the release of chemical or biological agents from the captured UAV 28 into the environment, and (d) a descent system 30 to bring the capture system 18 and a captured UAV 12 back to earth.

As used herein, the capture system 18 comprises one or more launch capsules 19 into which are packaged a plurality of foam mines 56. Upon release from the launch capsule 19, the foam mines 56 are scattered across the projected path of the UAV 12 in a pattern based on the capture area that each foam mine 56 is capable of achieving. Due to the kinetic energy of the UAV 12, the UAV 12 will substantially embed within the sticky foam 26, which absorbs energy while slowing the UAV's velocity. The foam mines 56 begin deploying foam 26 after release from the launch capsule 19 and are triggered either by an accelerometer, a timer, a manual signal from the CCC base, or any other technique known in the art. Lighter-than-air foaming gasses, such as helium, may be employed to help keep the foam aloft long enough to make contact with the UAV 12. As the UAV 12 flies through the minefield 58 the sticky foam 26 adheres the mines 56 to the surface of the UAV 12, 28. The impact between the UAV 28 and the foam mines 56 should generally be negligible so as not to trigger premature release of the biological or chemical weapon. The first foam mine 56 to contact and adhere to the UAV 12 will provide drag slowing the whole mass. As the mass slows, sticky foam 26 simultaneously encapsulates the UAV 12 preventing release of biological or chemical weapons.

In one embodiment, the descent system 30 comprises a canister 32 for deploying a descent parachute 34 attached to each foam mine 56. Each foam mine 56 that adheres to the UAV 12 will contain a descent parachute 34. The trigger for the descent parachute canister 32 may be an accelerometer, a timer, a manual signal from the CCC base, or any other technique known in the art.

In a third aspect, as shown in FIG. 9, the present invention provides a method for employing a catch and snare system 10 for an unmanned aerial vehicle 12 comprising: (a) monitoring 60 the perimeter 62 of a target site, (b) detecting 64 a UAV 12 within a predetermined distance of the perimeter 62, (c) launching 66 a capture system 18, (d) capturing 68 the UAV 28, wherein capturing the UAV 12, 28 comprises the steps of (i) deploying 70 a net 20, (ii) deploying 72 at least one decelerating parachute 25, (iii) deploying 74 foam 26, (iv) blocking 76 the UAV's flight path and causing the UAV 12 to contact the net 20, and (v) encapsulating 78 at least a portion of the UAV 28 in the foam 26 and the net 20, wherein the foam 26 prevents the release of chemical or biological agents from the captured UAV 28 into the environment, and (e) guiding 80 the captured UAV 28 to earth.

As used herein, deployment 72, 74 of the foam 26 and parachutes 25, 34, 52 from the various canisters 22, 24, 32, 50 is achieved using a trigger device such as an accelerometer, a timer, a manual signal from the CCC base, or any other technique known in the art. For example, in the foam deploying canister 22, the trigger device may activate the gas valve, or any other mechanism, that is intended to activate the canister 22. Similarly, the trigger device can activate a canister 24, 32, 50 for deploying a parachute 25, 34, 52 by causing a detonation via an explosive device or by release of fasteners holding portions of the canister 24, 32, 50 together.

In one embodiment, capturing 68 the UAV 12 further comprises the step of hovering 82 via the at least one decelerating parachute 25 prior to encapsulating 78 at least a portion of the UAV 28 in the foam 26 and the net 20.

In one embodiment, guiding 80 the UAV 28 comprises the step of deploying 84 at least one descent parachute 34.

In one embodiment, the net 20 is made of a lightweight, high strength fiber.

In one embodiment, the net 20 is made of spectra fiber.

In one embodiment, the net 20 is substantially planar upon deployment.

In a fourth aspect, as shown in FIG. 10, the present invention provides a method for employing a catch and snare system 10 for an UAV 12 comprising: (a) monitoring 60 the perimeter 62 of a target site, (b) detecting 64 a UAV 12 within a predetermined distance of the perimeter 62, (c) launching 66 a capture system 18, (d) capturing 68 the UAV 12, wherein the step of capturing 68 the UAV 12 comprises the steps of (i) dispersing 86 a plurality of foam mines 56 to create an aerial minefield 58, (ii) triggering 88 the plurality of foam mines 56 to expand just before the UAV 12 flies into the minefield 58, (iii) adhering 90 the plurality of foam mines 56 to the UAV 28 via surface contact with the foam 26 while the plurality of foam mines 56 continue to expand, and (iv) encapsulating 92 at least a portion of the UAV 28 in the expanded foam mines 56, wherein the foam 26 prevents the release of chemical or biological agents from the captured UAV 28 into the environment, and (e) guiding 80 the captured UAV 28 to earth.

In one embodiment, the plurality of foam mines 56 are dispersed from an airborne vehicle. The airborne vehicle may comprise a tethered balloon, a manned aerial vehicle, an unmanned aerial vehicle, or any other type of aerial vehicle known in the art. The airborne vehicle may physically move to a drop point and release the plurality of foam mines 56 or alternatively may launch a guided missile, which ejects the foam mines 56 above the interference position.

In one embodiment, the plurality of foam mines 56 are dispersed from a ground missile. The ground missile may launch from either a land- or water-based location and then release the plurality of foam mines 56 at the interference position.

The invention claimed is:

1. A catch and snare system for an unmanned aerial vehicle, the catch and snare system comprising:

a detection system configured to detect an unmanned aerial vehicle;

a deployment system in communication with the detection system;

a capture system configured to be placed at an interference position by the deployment system, wherein the capture system comprises a net configured to capture the unmanned aerial vehicle, a plurality of foam deploying canisters attached to the net and configured to deploy foam, and at least one canister configured to deploy at least one decelerating parachute attached to the net, wherein the foam is configured to prevent the release of chemical or biological agents from the unmanned aerial vehicle into the environment; and a descent system configured to bring the capture system and the unmanned aerial vehicle back to earth.

2. The catch and snare system of claim 1, wherein the foam has an expansion ratio that is at least 20:1.

3. The catch and snare system of claim 2, wherein the net is substantially planar upon deployment.

4. The catch and snare system of claim 1, wherein the plurality of foam deploying canisters are arranged along at least two lines that cross at the center of the net.

5. The catch and snare system of claim 1, wherein the capture system further comprises at least one canister attached to the net for deploying at least one hover parachute, and wherein the descent system comprises at least one canister attached to the net for deploying at least one descent parachute.

6. The catch and snare system of claim 1, wherein the net is designed in a helical non-interference interleaving pattern and the plurality of foam deploying canisters are spaced along the main lines extending from the center of the net to the net edges.

7. The catch and snare system of claim 6, wherein the capture system further comprises at least one canister attached to the net for deploying at least one hover parachute, and wherein the descent system comprises at least one canister attached to the net for deploying at least one descent parachute.

8. The catch and snare system of claim 1, wherein the net is made of a lightweight, high strength fiber.

9. The catch and snare system of claim 1, wherein the detection system is configured to transmit data to a command, control, and communications base that indicates a location, velocity, and trajectory of the unmanned aerial vehicle.

10. The catch and snare system of claim 1, wherein the deployment system comprises a tethered balloon or an aerial vehicle that is configured to launch the capture system to the interference position or drop the capture system to the interference position.

11. The catch and snare system of claim 10, wherein the aerial vehicle is configured to launch the capture system from a guided missile.

12. The catch and snare system of claim 1, wherein the capture system comprises a launch capsule comprising the net.

13. The catch and snare system of claim 1, wherein the net is configured to wrap around the unmanned aerial vehicle to capture the unmanned aerial vehicle.

14. The catch and snare system of claim 1, wherein each foam deploying canister of the plurality of foam deploying canisters is configured to generate a foam path, and wherein the plurality of foam deploying canisters are oriented in a cooperative direction so that foam paths merge and join completely to encapsulate at least a portion of the unmanned aerial vehicle.

15. A method for employing a catch and snare system for an unmanned aerial vehicle, the method comprising:
   monitoring a perimeter of a target site;
   with a detection system, detecting an unmanned aerial vehicle within a predetermined distance of the perimeter;
   upon detecting the unmanned aerial vehicle, placing the capture system at an interference position with a deployment system in communication with the detection system;
   capturing the unmanned aerial vehicle with the capture system, wherein the capture system comprises a net configured to capture the unmanned aerial vehicle, a plurality of foam deploying canisters attached to the net and configured to deploy foam, and at least one canister configured to deploy at least one decelerating parachute attached to the net, wherein the foam is configured to prevent the release of chemical or biological agents from the unmanned aerial vehicle into the environment, and wherein capturing the unmanned aerial vehicle with the capture system comprises:
      deploying the net to block a flight path of the unmanned aerial vehicle and cause the unmanned aerial vehicle to contact the net;
      with the at least one canister, deploying the at least one decelerating parachute attached to the net;
      with a plurality of foam deploying canisters attached to the net, deploying foam; and
      encapsulating at least a portion of the unmanned aerial vehicle in the foam and the net; and
   with a descent system, guiding the capture system and the captured unmanned aerial vehicle to earth.

16. The method of claim 15, wherein capturing the unmanned aerial vehicle further comprises hovering the net in mid-air, via the at least one decelerating parachute, prior to encapsulating at least a portion of the unmanned aerial vehicle in the foam and the net.

17. The method of claim 16, wherein the descent system comprises at least one descent parachute and guiding the capture system and the captured unmanned aerial vehicle to earth comprises deploying the at least one descent parachute.

18. The method of claim 15, wherein the plurality of foam deploying canisters are arranged along at least two lines that cross at a center of the net.

19. The method of claim 15, wherein the net is designed in a helical non- interference interleaving pattern and the plurality of foam deploying canisters are spaced along the main lines extending from a center of the net to edges of the net.

20. The method of claim 15, wherein placing the capture system at an interference position with the deployment system comprises launching a capsule comprising the net, the plurality of foam deploying canisters, and at least one canister configured to deploy the at least one decelerating parachute.

* * * * *